Figure 1:
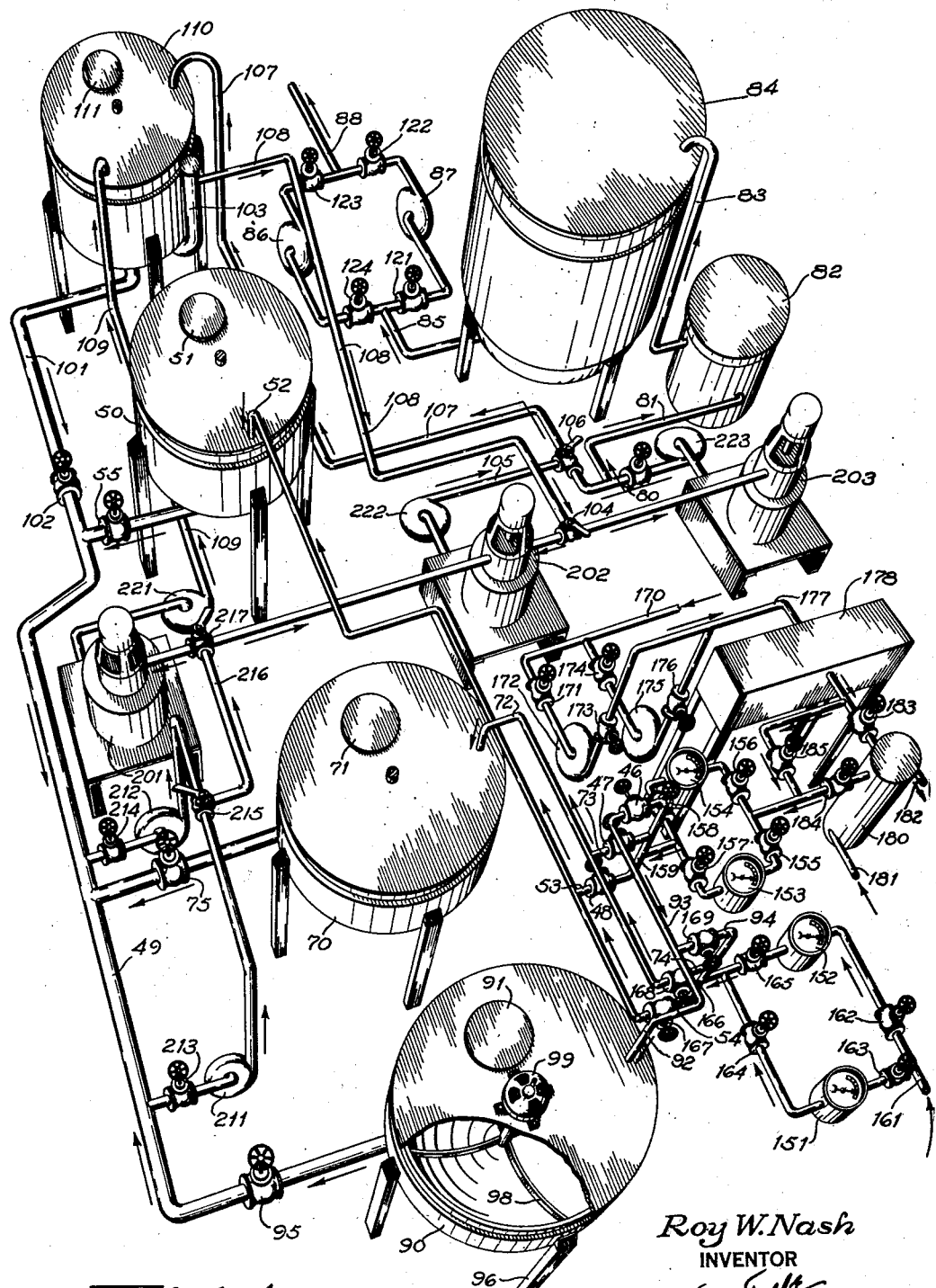

Jan. 4, 1944.　　　R. W. NASH　　　2,338,196
PRODUCTION OF VISCOSE
Filed Feb. 18, 1941　　　2 Sheets-Sheet 2

Roy W. Nash
INVENTOR

BY
ATTORNEY

Patented Jan. 4, 1944

2,338,196

UNITED STATES PATENT OFFICE 2,338,196

PRODUCTION OF VISCOSE

Roy W. Nash, Kenmore, N. Y., assignor to E. I. du Pont de Nemours & Company, Wilmington, Del., a corporation of Delaware Application February 18, 1941, Serial No. 379,412

4 Claims. (Cl. 260—217)

This invention relates to viscose, especially to advances in its production. More particularly, it appertains to reducing (to a fraction of their customary values) the time and power required for dissolving, or dispersing, the cellulose xanthate in aqueous caustic alkali solutions.

Although there are minor slight variations in the processes employed by different manufacturers, the preparation of viscose for use in the rayon and sheet wrapping material industries is now fairly well conventional. In general the cellulose (cotton linters, purified wood pulp, or the like) is impregnated (steeped) with concentrated aqueous sodium hydroxide to form alkali cellulose, the excess caustic soda solution squeezed out, the press cake shredded to crumbs, the crumbs aged (to degrade the cellulose) under controlled conditions (time, temperature, environmental oxygen, etc.) to provide inter alia for proper viscose viscosity, the aged crumbs treated with carbon bisulfide to produce sodium cellulose xanthate (a lumpy, orange-colored product varying from a mealy to a sticky consistency), the xanthate dissolved or dispersed in dilute aqueous caustic alkali, the solution or dispersion filtered and the resultant viscose ripened (aged) until suitable for extrusion into filaments, films, etc.

There is no need to burden this specification with the details of cellulose xanthate preparation, since a plethora exists in the patent literature.

Generally the xanthate is dissolved or dispersed by dumping it, together with dilute caustic alkali, into large specially designed vessels equipped with agitators (see for example U. S. A. Patent No. 1,763,379) and stirring the mixture for several hours. The power required to dissolve a batch of xanthate in this operation is considerable.

This invention had for an object the decreasing of the cost of the plant required for viscose manufacture. Other objects were to devise a means of dissolving cellulose xanthate material in viscose production which would eliminate the lengthy mixing of the xanthate with dilute caustic alkali, which would greatly reduce the expenditure of power for stirring cellulose xanthate material with dilute aqueous caustic alkali, and which would greatly reduce the amount of apparatus and floor space necessary for the manufacture of viscose. Still further objects were to secure complete solution of cellulose xanthate material in viscose preparation in a very short time, to eliminate the bulky and costly machinery used in the conventional procedure for preparing viscose and to provide new and improved methods and apparatuses for the solution of sodium cellulose xanthate and dilute aqueous caustic alkali. A general advance in the art, and other objects which will appear hereinafter, are also contemplated.

It has now been found that a satisfactory viscose can be prepared by slurrying sodium cellulose xanthate in dilute aqueous sodium hydroxide solution, passing the slurry through a disintegrator machine, allowing the mixture of caustic soda solution and disintegrated cellulose xanthate material to rest for a short time, and then passing the mixture through a second disintegrator machine.

Figure 2:
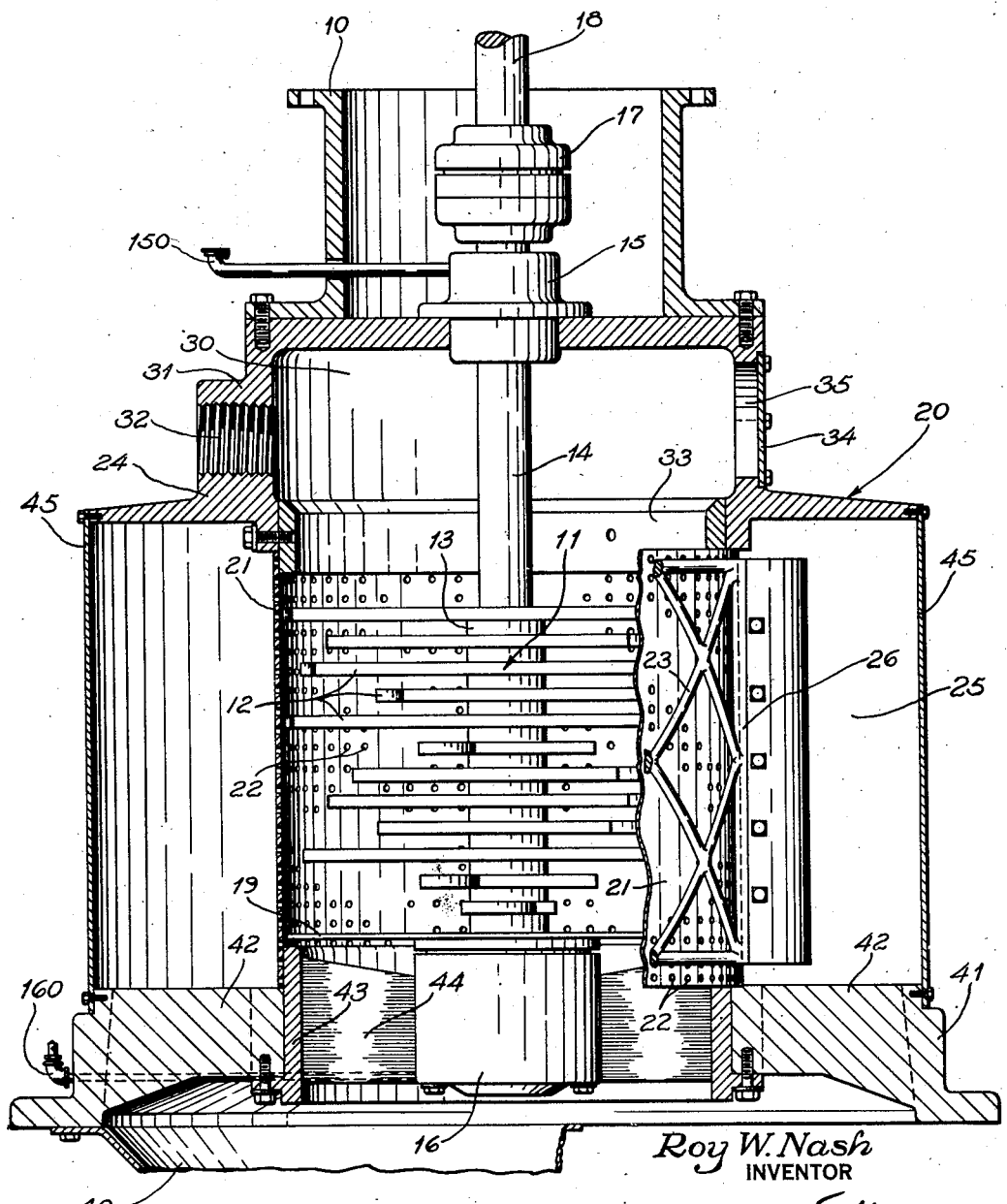

How the foregoing objects and related ends are accomplished will be apparent from the following exposition, in which are disclosed the principle and divers embodiments of the invention, including the best mode contemplated for carrying out the same. The written description is amplified by the accompanying drawings, in which:

Figure 1 is a perspective view (partially conventionalized) of the apparatus of the present invention; and Figure 2 is an elevation view, partly in section, of one of the disintegrator machine units.

Similar characters refer to similar parts throughout the drawings, in which, in Figure 1, the numerals 50, 70 and 90 represent tanks or vats in which the slurry of the viscose components (sodium cellulose xanthate and dilute aqueous alkali metal hydroxide) is prepared. These tanks have covered manholes 51, 71 and 91, respectively, for the addition of the sodium cellulose xanthate. The fluid components of the viscose are added to the respective tanks through lines 52, 72 and 92, respectively. In ordinary practice the fluid components comprise strong caustic soda solution, which is supplied through lines 53, 73 and 93, respectively, and soft water (for diluting the strong caustic to the desired extent) which is supplied through lines 54, 74 and 94, respectively. Meters 151 and 152 are provided for measuring the amount of water, and meters 153 and 154 are provided for measuring the amount of caustic solution flowing into the premixed slurry tanks.

The water enters the apparatus through line 161. It may pass through either meter 151 or meter 152 into the aforementioned slurrying tanks. Valves 162 and 163, 164 and 165, together with appropriate piping, enable the operator to direct the flow through the desired meter. It will be understood that in an apparatus of this character a certain duplication of apparatus is desirable in order to prevent shut-downs while certain portions of the apparatus are being repaired or cleaned. The soft water, after being metered, flows into a manifold 166, from which valves 167, 168 and 169 regulate its flow into vats 50, 70 and 90.

The concentrated caustic enters the system through line 170. Duplicate apparatus comprising valve 171, pump 172, and valve 173, and valve 174, pump 175 and valve 176, respectively, is provided for forcing the caustic solution through line 177 into filter press 178.

A brine cooler 180, having brine inlet 181 and outlet 182, is provided for cooling the caustic as it leaves the filter press, when necessary. Valves 183, 184 and 185 govern the flow of the caustic to the meters 153 and 154. By opening valves 183 and 184, and closing valve 185, the caustic solution is forced through the cooler. By closing valves 183 and 184 and opening valve 185, the solution is shunted past the cooling apparatus.

The caustic solution may be passed through either of the meters by suitable regulation of its valves 155, 156, 157, and 158. The metered caustic solution enters the manifold 159, from which valves 46, 47 and 48 regulate its flow into lines 93, 73 and 53 respectively.

Valves 55, 75 and 95 control the flow of the xanthate caustic slurry from tanks 50, 70 and 90, respectively, to the manifold feed line 49 for the disintegrators. Pumps 211 and 212, controlled by inlet valves 213 and 214, respectively, and two-way valve 215, remove the slurry from the aforementioned manifold line and force it to the disintegrators through line 216. A two-way valve 217 directs the flow from line 216 to disintegrator 201 or disintegrator 202, as desired.

A pump 221 removes material which has passed through disintegrator 201, and forces it into inter-mixing tank 110 through line 109. When the disintegrator 202 is used for initial slurry treatment, a pump 222 forces the material from the disintegrator through line 105, two-way valve 106 and line 107, into the inter-mixing tank 110.

After the slurry has received its first disintegrator treatment and has been collected in the inter-mixing tank, it is subjected to a second disintegrator treatment in order to complete the solution or dispersion of the xanthate. A line 101, controlled by valve 102, permits the material from the inter-mixing tank to flow back into the line 49, from where it can be passed a second time through disintegrator 201 or 202, as desired.

An alternative piping system, comprising stand-pipe 103, and line 108 conducts the material from the tank 110 to a two-way valve 104, which directs its flow into either disintegrator 202 or disintegrator 203, as desired, for its second treatment.

Material which has passed through disintegrator 203 is removed by pump 223 and forced through valve 80 and line 81 through after-cooler 82 to line 83, which delivers it to storage or blending tank 84. If the material from the tank 110 is given its second pass through disintegrator 202, then the valve 80 is kept closed and the pump 222 forces the viscose thus produced through line 105 and valve 106 into line 81.

The tank 84 is large enough to receive more than one charge from slurrying tanks 50, 70 and 90, in case blending of batches is desired. The tank 110 is not so large, and it is customary to remove the material from the bottom of the tank at the same time it is being pumped into the top. The viscose is removed from the tank 84 through line 85 by pump 86 or pump 87, and passed through line 88 to filters, from whence it is used in the formation of shaped articles. Valves 121, 122, 123 and 124 control the flow of the viscose through the alternative pumping systems which include pumps 86 and 87.

A manhole 111 permits the inter-mixing tank 110 to be used as a slurrying tank in an emergency. A pump (not shown) is provided to keep the stand-pipe 103 under appropriate pressure. This pressure may be regulated so that the line 108 operates under a gravity flow when desired. The stand-pipe and pump may be eliminated by having the tank 110 at an elevation which permits gravity flow into the line 108.

The slurrying tanks

The slurrying tanks 50, 70 and 90 and the inter-mixing tank 110 are similar in construction, so that a description of the specific features of one will be sufficient illustration for the present specification. These tanks or vats are generally cylindrical, with bottoms arranged to facilitate gravity drainage. The coverings are flat, and of sufficiently rigid construction to support a motor for driving the agitator with which each is equipped. The tank 90, for instance, comprises a paddle agitator 98 driven by motor 99. The tank is supported in the conventional manner by steel beam uprights such as that shown at 96.

The distintegrator

The distintegrator (comminutor, homogenizer) is of the type disclosed in U. S. A. Patent No. 2,153,590 (Reitz). The modification indicated at 20 in Figure 2 comprises a rotor indicated at 11 and a surrounding perforate screen 21.

The rotor comprises a shaft 14 carrying spaced blades (or hammers) 12. A circular disc 19 substantially coextensive with the space in which the rotor operates, closes the bottom of the rotor chamber. The shaft is journaled in a lower thrust bearing 16 and an upper bearing 15.

The screen 21 is supported by an upper brace ring 33 and a lower ring 43.

These rings, and the aforementioned shaft bearings, are supported by the main frame 24 (or framework) of the distintegrating machine 20. This framework comprises an upper housing 31 and a lower base or pedestal 41 maintained in their relative positions by circumferentially spaced struts or webs (not shown).

The upper housing generally resembles a cylinder with an outwardly-extending flange at its lower edge. In the cylindrical portion there is a threaded passageway 32 for the introduction of the material to be processed, and a utility opening (for cleaning, etc.). As shown in the drawing, the utility opening 35 is closed by a plate 34 bolted thereover. The bearing 15 closes the only other opening (unless the fact that the cylindrical portion is bottomless be considered as providing another opening) in this housing, so that the upper housing provides a free space 30 above the rotor.

The pedestal 41 comprises generally a spider made up of concentric annular sections connected by webs 42. The inner annulus supports the annular brace 43 and the thrust bearing 16. The thrust bearing housing is connected to the brace 43 by means of webs or struts 44.

A removable guard or closure 45 connects the pedestal 41 with the flange portion of the upper housing 31, and with them defines a space 25 surrounding the screen 21. This space opens through the spider-like base to a delivery chute, the upper portion of which is indicated at 40. A framework 29 is provided to reenforce the screen 21. This grid, which compensates for the weakening caused by the perforations 22, is in sections which bolt together through radial flanges 26 and omega or psi-shaped clamps which enclose the projecting flange ends. When a strong screen is employed the grid is unnecessary. Circular perforations 13/64 of an inch in diameter in the screen are preferred.

In operation the slurry of cellulose xanthate and aqueous alkali metal hydroxide enters the disintegrator through opening 32. It then passes through space 30 and upper ring 33 on to the rotor 11. The rotor, which moves at a rate of about 3600 R. P. M., homogenizes the viscose by throwing the slurry against and through the screen 21 and grid 23 into the space 25. From there it drops through the base of the disintegrator, into the chute 40, from which it is removed for further treatment.

Power is supplied to the rotor shaft from a driven shaft 18 through coupling 17. A circular frame 10 serves as a guard around the coupling 17 and as a support for a motor (not shown) to drive the shaft 18. Oiling or lubricating devices or ducts 150 and 160 are provided for upper and lower rotor bearings, respectively.

The rotor blades are spaced circumferentially. Separators 13 may be inserted between the blades to secure vertical spacing, if desired, but this construction is not ordinarily employed due to the satisfactory positioning resulting from the circumferential spacing. Polygonal apertures fitting over correspondingly shaped surfaces on the rotor shaft in the separators and blades (or conventional keyways), insure positive movement thereof while the machine is in action.

Figure 2, which is an elevation view partly in section, shows the manner in which the parts 34, 43, 31 and 41 position and support the screen 21. A tramp plate may be used to close the opening in the brace 43 under the bearing 16.

Parts are given by weight throughout the specification unless otherwise specified.

Example

Sheets of purified wood pulp, having an alpha cellulose content of 90%, were steeped in 18% aqueous sodium hydroxide, and the excess caustic alkali solution squeezed therefrom. The ratio of the pressed sheets to the dry cellulose was approximately 3:1. These impregnated pulp sheets were then passed through a conventional shredding device which macerated the material to a fluffy, fibrous mass which was allowed to age in air for a period of 48 hours at 25° C. The aged material was then treated with 10 pounds of carbon bisulfide for each 100 pounds of alkali cellulose, to produce sodium cellulose xanthate.

After the xanthating reaction just described was complete, 1000 pounds of the sodium cellulose xanthate was dumped into a slurry tank such as that shown at 90 in Figure 1. Prior to the addition of the sodium cellulose xanthate, 3150 pounds of 3.25% sodium hydroxide solution had been introduced into the tank. The xanthate and alkaline solution were thoroughly mixed by paddle agitator, and the resulting slurry pumped to a disintegrator such as that shown at 201 in Figure 1 and illustrated in detail in Figure 2 of the drawings. Usually not more than 15 minutes is required for mixing of the slurry. In the apparatus shown in Figure 1, the slurry would pass through valve 95, and either pump 211 or pump 212 into the disintegrator 201.

The blades of the disintegrator utilized had a diameter of 18 inches and rotated at a speed of 3600 R. P. M. The material had a cloudy appearance (due to undissolved xanthate and/or air bubbles) as it flowed from the disintegrator, showing that the sodium cellulose xanthate had been thoroughly dispersed in the solution by the operation of the disintegrator. The capacity of the disintegrator varies with the heighth of the screen and rotor. A screen 6 inches deep will handle about 150 pounds of slurry per minute. A screen 12 inches deep, having the preferred size perforations, will handle about 340 pounds per minute. The power required to operate the disintegrator increases with increases in density (stickiness increase in solids) of the slurry. The material was passed to an inter-mixing tank, such as that shown at 110 in Figure 1, where it was allowed to remain for an average period of 10 minutes at a temperature of 15°–16° C., while more of the sodium cellulose xanthate dissolved. In the apparatus of Figure 1, a pump 221 is utilized to force the material from the disintegrator 201 to the inter-mixing tank 110.

The material in the inter-mixing tank was then passed through a second disintegrator such as that shown at 202 in Figure 1. In ordinary operation material is removed from the bottom of the inter-mixing tank for passage to the second disintegrator at the same time that the material is flowing into the intermixing tank from the first disintegrator. A gravity flow is sufficient for this transfer of material. The second disintegrator was of the same type, and was operated in the same manner as the first disintegrator through which the material passed. Solution of the sodium cellulose xanthate was then complete, and the material from the second disintegrator was passed through a heat interchanger which reduced its temperature to 18° C. The cooled viscose was then passed to a storage tank, where it was allowed to ripen for a suitable time and at a suitable temperature to impart the desired viscosity and coagulation characteristics. It was then deaerated, filtered, and passed to extrusion apparatus for the formation of shaped articles. In the apparatus of Figure 1 a pump 222 removes the material from the disintegrator 202 and forces it through the after-cooler (heat inter-changer) 82 to the storage or blending tank 84. Transfer of the material from the tank 84 is brought about by either pump 86 or pump 87.

In an alternative operation, the inter-mixing tank and slurrying tank are jacketed for brine solution cooling, thereby eliminating the heat interchanger and the necessity therefor. With this set up the viscose material is cooled by contact with the tank walls to an extent which compensates for the temperature rise which takes place in passing through the respective succeeding disintegrator.

The pumps, piping and other apparatus of the present invention are conventional, but a great variety of arrangements of the same will be suggested to those skilled in the art where variations to meet particular conditions are necessary. The invention is well adapted to the continuous production of viscose, and it may be in some instances desirable to eliminate the storage period between the two disintegrator treatments.

This is the first instance where this type of action has been used for dissolving—heretofore disintegrators have been used only for grinding and/or dispersion of insoluble materials. Pressure zones of various types in the disintegrator can be adumbrated by varying the length of the rotor plates (hammers, slats) and the pattern in which they are fanned out along the rotor shaft.

It is to be understood that a great variety of cellulose pulp and other materials may be employed in the production of the xanthate and the viscose, and that the present invention is applicable thereto. Applicant's preferred slurry (the material first fed to the disintegrator) is quite watery because the viscose and intermediate product flow like a liquid when the original lumps are broken up (by the disintegrator).

Viscose must be entirely free of fiber or gel particles in order that the delicate extrusion apparatus used in the formation of films, filaments, tubing, etc., will not become clogged during operation. Even an occasional particle of solid matter in the viscose stream will cause interruptions of serious (expensive) consequence in the forming process. The usual steps of filtration of the viscose before extrusion are utilized in the present invention. An increase of about 10% in the amount of viscose passing through the filter between press dressings has been noted.

Other advantages of the present invention are believed to be self-evident. The solution of the xanthate is accomplished rapidly and thoroughly. The ease with which the solution and homogenization are effected by the process, represents a great saving in time, power and labor. A large amount of the apparatus and floor space needed in the heretofore known processes is eliminated. There is a great saving in initial investment in the building of a plant.

In the past the time factor in dissolving the xanthate has been subject to very careful control because the element of time is important in every phase in the production of viscose, beginning with the treatment of the cellulosic raw material. The time which the viscose stays in the relatively expensive dissolving apparatus is reduced approximately 66%. In cases where extended storage of the viscose must take place, only the relatively cheap storage tanks are involved. The method of the present invention insures complete solution or dispersion in the time allotted to the disolving step.

As many apparently widely different embodiments of this invention may be made without departing from the spirit and scope thereof, it is to be understood that this invention is not limited to the specific embodiments thereof except as defined in the appended claims.

I claim:

1. A process of preparing viscose which comprises placing into a container cellulose xanthate and an aqueous sodium hydroxide solution in such proportions as to produce the desired viscose composition, stirring said viscose components to produce a slurry, forming a stream of said slurry, beating said stream into particles and throwing the said particles against an apertured surface until a uniform homogeneous viscose composition is formed.

2. A process of preparing viscose which comprises placing into a container cellulose xanthate and an aqueous sodium hydroxide solution in such proportions as to produce the desired viscose composition, stirring said viscose components to produce a slurry, subdividing said slurry into particles, and throwing the said particles against an apertured surface until a uniform homogeneous viscose composition is formed.

3. A process of preparing viscose which comprises forming a slurry of cellulose xanthate and an aqueous sodium hydroxide solution, forming a stream of said slurry, beating said stream into particles and throwing the said particles against an apertured surface until a uniform homogeneous composition is formed.

4. A process of preparing viscose which comprises forming a slurry of cellulose xanthate and an aqueous sodium hydroxide solution, and subdividing said slurry into particles and throwing said particles against an apertured surface until a uniform homogeneous viscose composition is formed.

ROY W. NASH.

CERTIFICATE OF CORRECTION.

Patent No. 2,338,196. January 4, 1944.

ROY W. NASH.

It is hereby certified that error appears in the printed specification of the above numbered patent requiring correction as follows: Page 2, first column, line 42, after "for" insert --the--; page 3, first column, line 44, for "34" read --33--; and second column, line 35, for "distintegrator" read --disintegrator--; page 4, second column, line 5, for "disolving" read --dissolving--; and that the said Letters Patent should be read with this correction therein that the same may conform to the record of the case in the Patent Office.

Signed and sealed this 15th day of February, A. D. 1944.

(Seal)

Henry Van Arsdale,
Acting Commissioner of Patents.